US009009586B2

(12) United States Patent
Peterson (10) Patent No.: US 9,009,586 B2
(45) Date of Patent: Apr. 14, 2015

(54) KNOWLEDGEBASE ARTICLE AUTHORING SYSTEM, APPARATUS AND METHOD

(76) Inventor: Micah Nathanael Peterson, Quispamsis (CA)

(*) Notice: Subject to any disclaimer, the term of this patent is extended or adjusted under 35 U.S.C. 154(b) by 470 days.

(21) Appl. No.: 13/547,234

(22) Filed: Jul. 12, 2012

(65) Prior Publication Data

US 2014/0019853 A1   Jan. 16, 2014

(51) Int. Cl.
*G06F 17/00* (2006.01)
*G06F 9/44* (2006.01)

(52) U.S. Cl.
CPC ............................ *G06F 8/10* (2013.01)

(58) Field of Classification Search
CPC ..................................................... G06F 17/24
USPC .................... 715/221, 222, 224, 225
See application file for complete search history.

(56) References Cited

U.S. PATENT DOCUMENTS

| | | | |
|---|---|---|---|
| 5,982,370 A | 11/1999 | Kamper | |
| 7,246,118 B2 | 7/2007 | Chastain et al. | |
| 7,925,993 B2 | 4/2011 | Williams | |
| 8,131,647 B2 | 3/2012 | Siegel et al. | |
| 8,417,593 B2* | 4/2013 | Schmitt et al. | 705/29 |
| 8,756,274 B2* | 6/2014 | Hanumolu et al. | 709/203 |
| 8,762,453 B2* | 6/2014 | Vins et al. | 709/203 |
| 2002/0057293 A1 | 5/2002 | Liao | |
| 2008/0005751 A1 | 1/2008 | Chandra | |
| 2008/0046104 A1* | 2/2008 | Van Camp et al. | 700/90 |
| 2008/0313124 A1* | 12/2008 | Arseneault et al. | 706/50 |
| 2009/0063175 A1* | 3/2009 | Hibbets et al. | 705/1 |
| 2010/0030859 A1 | 2/2010 | Huang | |
| 2010/0186004 A1 | 7/2010 | Will et al. | |
| 2011/0246881 A1* | 10/2011 | Kushman et al. | 715/708 |
| 2014/0081953 A1* | 3/2014 | Ingram et al. | 707/722 |

OTHER PUBLICATIONS

Edding digital highlighter (http://frida-frommen.de/awards/digitalhighlighter/0/), captured from the web in Jul. 2012.
Simple highlighter (https://chrome.google.com/webstore/detail/hljnlfolmbmibdjaikiaepgepgnldclj?hl=en-GB), captured from the web in Jul. 2012.

* cited by examiner

*Primary Examiner* — Stephen Hong
*Assistant Examiner* — Matthew Ludwig
(74) *Attorney, Agent, or Firm* — Goudreau Gage Dubuc; Hugh Mansfield (57) ABSTRACT

A method and apparatus for authoring an article entry comprising a plurality of data fields from at least one electronic document and storing the article in a knowledgebase. The apparatus comprises an authoring applet displayed on an electronic display, the applet comprising a plurality of panes, one of each of the panes associated with a respective one of the plurality of article data fields, wherein the selection device is used to highlight a text snippet from the at least one electronic document by moving a cursor to a start of the text snippet, depressing and holding a user operable selection device button while moving the cursor to an end of the text snippet wherein on release of the button the highlighted text snippet is copied to an active pane as a pane content and for subsequent editing and publishing to the knowledgebase.

22 Claims, 10 Drawing Sheets

KNOWLEDGEBASE ARTICLE AUTHORING SYSTEM, APPARATUS AND METHOD

FIELD OF THE INVENTION

The present invention relates to a knowledgebase article authoring system apparatus and method. In particular, the present invention relates to a system, apparatus and method for highlighting text in diverse documents and extracting the text as an article to a knowledgebase for subsequent searching.

BACKGROUND OF THE INVENTION

In client service departments as commonly found within software companies and the like, a major preoccupation is to provide courteous, efficient and knowledgeable client support in order to improve client satisfaction, thereby improving revenues through maintenance renewal and the purchase of future software offerings. This also provides a powerful "word of mouth" marketing tool as satisfied customers extol others with views of their positive experience with the company. One drawback of existing client support systems is that, although it is relatively easy to find courteous and efficient support staff, knowledgeable support staff are at a premium as an intimate knowledge of the software or product is learned through many months or years of experience with the software or product. Two problems arise from this: 1) that each support staff member becomes a silo of information, i.e. the knowledge they have gained remains in their heads and is not easily accessible by others; and 2) if support staff member leaves the department, or worse, the company itself, that staff member's knowledge also leaves. It is no small task to capture this knowledge and make it accessible to others.

Software companies with customer facing product support, commonly referred to as "tech support", typically invest in Customer Relationship Management (CRM) software and most tech support managers require that their employees enter case notes for every interaction with customers. One of the drawbacks of these large CRM applications is that they do not have the ability to summarize or extract the key knowledge being captured through these interactions.

Additionally, case notes in and of themselves are of little value if they are simply stored in a knowledgebase given that they are typically long and, as in note form, somewhat cryptic. Indeed, many contain many half-sentences, poor grammar and even sensitive client information. As a result, although the cases notes are necessary and are used for many other purposes, attempting to search them and use the knowledge they encapsulate to solve future cases does not provide a viable option.

On the other hand, functionality is often built into CRM software to add knowledgebase articles and the like. However, this is separate from the case notes and a large amount of manual effort is required to read the case notes, summarize them and then write the knowledgebase article. This kind of manual solution therefore comes at a decidedly high cost, and a highly tuned and efficient support team seldom has time to write extensive case notes, let alone summarize them and author knowledgebase articles. Indeed, even if they do have time, there is not a high enough incentive to create a knowledgebase article until one is sure that the issue might happen again in the future and as a result, issues are typically repeated four or five times with the same support employee before an article is created. Even then, the manual effort required and the time constraints placed on support from constant customer demands could mean that the knowledge base article never gets written. As a result, the task of writing knowledge base articles is largely a volunteer one. So while knowledgebase functionality exists, the CRM software does not enable the flow of knowledge from case notes to the knowledgebase.

Still, some companies force their employees to create knowledgebase articles, which typically results in tech support staff spending more time authoring knowledgebase articles, resulting in customers waiting longer for help.

Hybrid CRM and Case Management software solutions do exist and do attempt to meet these needs. However, these solutions typically do a much better job of leveraging knowledgebases to fuel self-service websites and make knowledge more searchable, however there is still a large gap with the conversion of case notes to knowledgebase articles.

SUMMARY OF THE INVENTION

In order to address the above and other drawbacks there is provided a method for authoring an article entry comprising a plurality of data fields from at least one electronic document and storing the article in a knowledgebase, the at least one electronic document each comprising at least one readable text snippet. The method comprises the acts of:
  (a) displaying the at least one electronic document on an electronic display,
  (b) displaying an applet comprising a plurality of panes on the electronic display, one of each of the panes associated with a respective one of the article entry data fields and configured for receiving and displaying a pane content,
  (c) activating one of the panes,
  (d) using a selection device to highlight a text snippet from the at least one electronic document by moving a cursor to a start of the text snippet, engaging and holding a user operable selection means while moving the cursor to an end of the text snippet wherein on release of the user operable selection means the highlighted text snippet is copied to the active pane as the pane content,
  (e) repeating acts (c) and (d) for each of the plurality of panes, and
  (f) storing the pane content as the article entry in the knowledgebase, wherein for each of the panes, the pane content is stored in the article entry data field associated with the pane.

There is also disclosed an apparatus for authoring, storing and searching a plurality of knowledgebase articles based on at least one electronic document each comprising at least one text snippet. The apparatus comprises a knowledgebase for storing the plurality of articles, each article comprising a plurality of data fields, an electronic display, a selecting device comprising a user operable button, an article authoring applet displayed on the monitor, the applet comprising a plurality of panes, one of each of the panes associated with a respective one of the plurality of article data fields, wherein the selection device is used to highlight a text snippet from the at least one electronic document by moving a cursor to a start of the text snippet, engaging and holding a user operable selection means while moving the cursor to an end of the text snippet wherein on release of the user operable selection means the highlighted text snippet is copied to an active pane as a pane content, a means for selecting one of the panes as the active pane, a means for storing the pane content of the plurality of panes as an article in the knowledgebase, wherein for each of the panes, the pane content is stored in the article data field associated with the pane, and a search engine comprising a keyword search input field and a search results display, wherein when a keyword entered via the search input field matches an entry in the knowledgebase, at least a title of the entry is displayed in the search results display.

Additionally, there is disclosed a computer system comprising a computer program executing on the system. The program maintains a knowledgebase having a data structure comprising a plurality of data fields, displays at least one electronic document each comprising at least one readable text snippet on a display monitor, displays an applet comprising a plurality of panes on the display monitor, one of each of the panes associated with a respective one of the plurality of data fields and configured for receiving and displaying a pane content, provides a means for selectively activating each the panes, wherein only one of the panes is active at a time, for each of the panes when activated, provides a user operable selection device for highlighting a text snippet from the at least one electronic document by moving a cursor to a start of the text snippet, engaging and holding a user operable selection means while moving the cursor to an end of the text snippet wherein on release of the user operable selection means the highlighted text snippet is copied from the at least one document to the active pane as the pane content, stores the pane content as an entry in the knowledgebase, the entry having the data structure and wherein for each of the panes, the pane content is stored in the entry data field associated with the pane, and provides a search engine comprising a keyword search input field and a search results display, wherein when a keyword entered via the search input field matches an entry in the knowledgebase, at least a title of the entry is displayed in the search results display.

DESCRIPTION OF ILLUSTRATIVE EMBODIMENTS

Figure 1A:
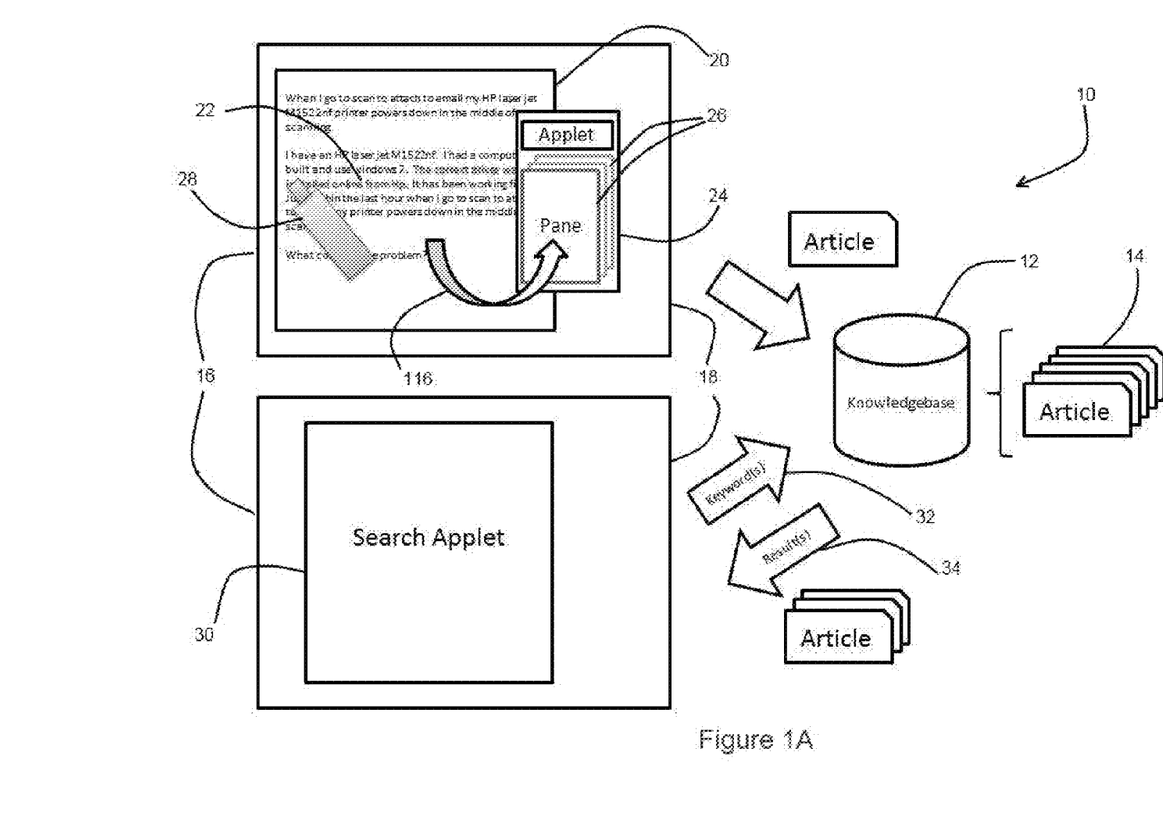
FIG. 1A is a schematic diagram of a knowledgebase article authoring system in accordance with an illustrative embodiment of the present invention.

Referring now to FIG. 1A, a knowledgebase article authoring apparatus/system, generally referred to using the reference number 10 and in accordance with an illustrative embodiment of the present invention, will now be described. The system 10 comprises a computer including a processor, a non-transitory computer readable storage medium for executing a computer program, a memory, and a knowledgebase 12 which receives and stores articles 14 authored using an apparatus 16 for authoring, storing and searching knowledgebase articles. The apparatus 16 comprises an electronic display 18 and associated computer system (not shown) illustratively comprising a general purpose operating system comprising a Graphical User Interface (GUI) such as Microsoft™ Windows™, or the like and on which is displayed at least one electronic document 20 comprising at least one text snippet 22. In this regard, the electronic display 18 may comprise a single electronic display monitor, or a plurality of such electronic display monitors. An authoring applet 24 comprising a plurality of panes as in 26 is also provided as well as a cursor 28 for highlighting the at least one text snippet 22. Each article 14 is divided into a plurality of data fields (not shown) and would typically also include a title data field (also not shown).

Still referring to FIG. 1A, the apparatus 16 further comprises a search applet 30 for entering a keyword 32 for querying the knowledgebase 12 and, following retrieving one or more articles 14 from the knowledgebase 12, displaying the search results 34 to the user. Typically, the knowledgebase 12 is implemented at a remote location from the electronic display 18 and associated computer system (again, not shown) which are interconnected with the knowledgebase 12 using a suitable means such as a local area network, the Internet or the like, and thereby allowing a plurality of users and authoring applets 24 of the present invention to publish to and otherwise search the contents of the knowledgebase 12. In a particular embodiment, however, the knowledgebase 12 could also be implemented as part of the associated computer system.

Figure 1B:
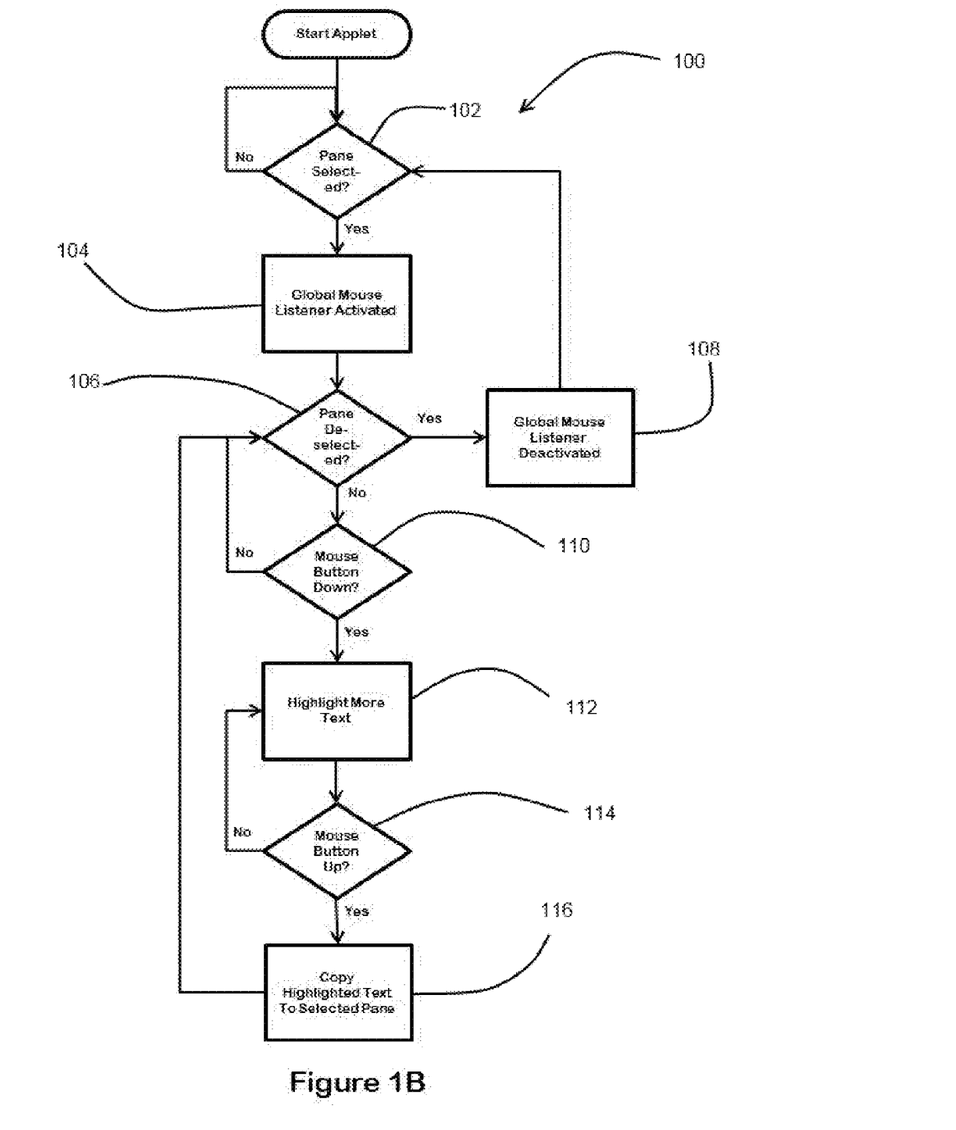
FIG. 1B is a flow chart of a method of authoring a knowledgebase article in accordance with an illustrative embodiment of the present invention.

Referring now to FIG. 1B in addition to FIG. 1A, the highlighting function of the authoring applet 24 will now be described using a flow chart 100. Once the applet is activated or started, the user selects a pane 102 which activates a global mouse listener. The global mouse listener provides the applet 24 with the activity of the cursor/mouse (or other pointing/selecting device) regardless of the component (application window) where the mouse is currently located. This allows, for example, the authoring applet 24 to take advantage of the activity of the cursor 28 when the cursor is active within another application window, such as the one displaying the electronic document 20. Note that although the present illustrative embodiment comprises the use of a mouse, in an alternative embodiment other pointing/selecting devices, including for example touchpads, trackballs, joysticks, pointing sticks, stylus and touchscreens could also be used as replacements for the mouse.

Still referring to FIG. 1B, in the event that the same pane is selected 106, the global mouse listener is deactivated 108. In the event the cursor 28 is moved to activate another component/application window, for example the one displaying the electronic document 20, the global mouse listener remains active. In the event that the mouse button is depressed, 110, text within the active window, illustratively a portion of the text of the electronic document 20, can be subsequently highlighted 112 using the cursor 28. Of note is that, in order for a mouse button down event to be registered, a predetermined time, illustratively more than 200 milliseconds, must transpire, thereby improving ergonomics and simplifying event handling within the authoring applet 24. Release of the mouse button 114 after 200 milliseconds therefore causes the highlighted/selected text snippet 22 of the electronic document 20 to be copied 116 to the active pane 26.

Figure 2A:
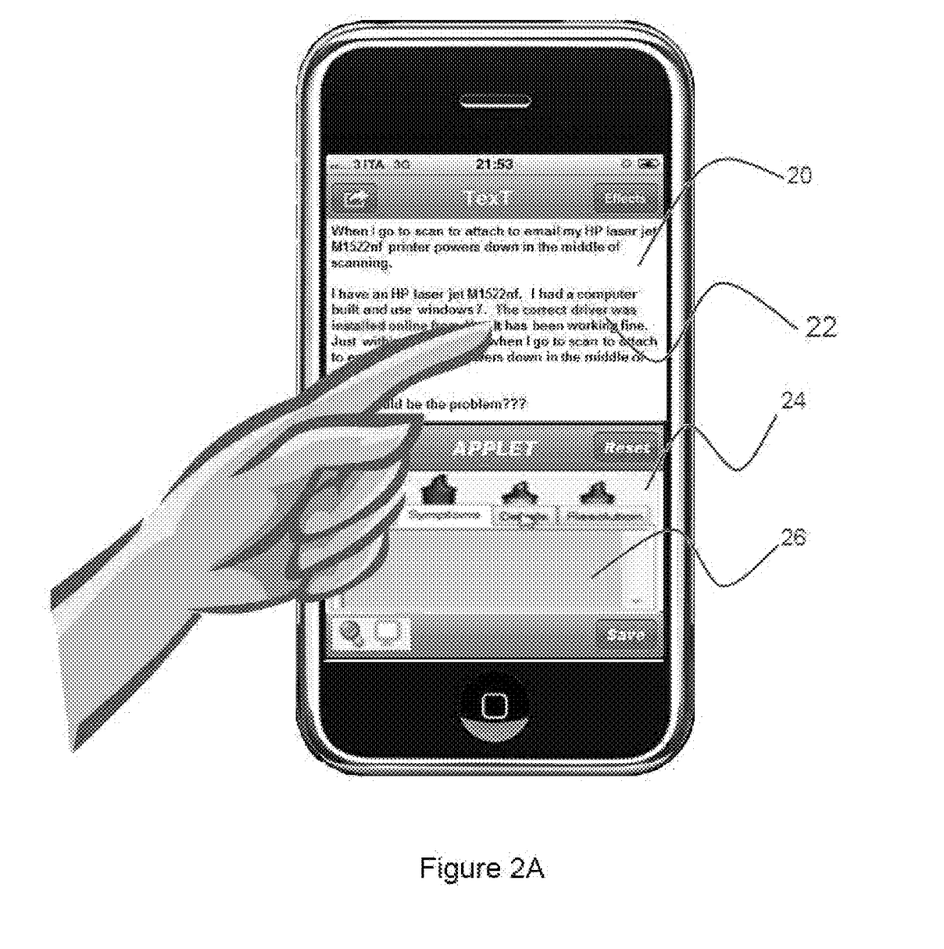
FIG. 2A is a front plan view of a knowledgebase article authoring applet in accordance with an alternative illustrative embodiment of the present invention.

Referring now to FIG. 2A, as discussed above, in an alternative embodiment, the mouse can be replaced by a touchscreen, such as found on a Smartphone or tablet or the like, on which the electronic document 20 is displayed together with the authoring applet 24 and in combination with a user's finger or an appropriate stylus (not shown).

Figure 2B:
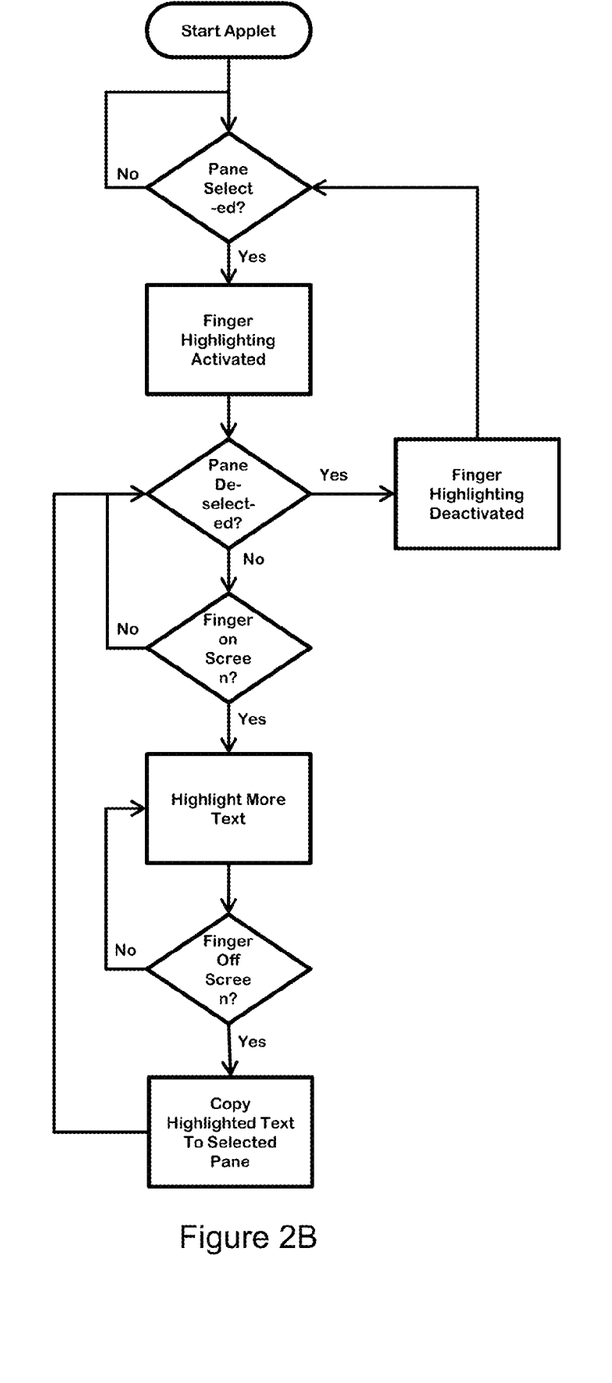
FIG. 2B is a flow chart of a method of authoring a knowledgebase article in accordance with an alternative illustrative embodiment of the present invention.

Referring to FIG. 2B in addition to FIG. 2A, in operation use of a touchscreen is similar to that of a mouse, although in this regard the text highlighting/selection operation, as will now be understood by a person of ordinary skill in the art, is provided through contact between the user's finger or stylus and the touchscreen. In particular, once a given pane 26 is activated highlighting/selection of a text snippet 22 in the electronic document 20 can be commenced by touching the screen at a point coincident with a start of the text to be highlighted/selected wherein subsequent raising of the user's finger away from the touchscreen causes the text snippet 22 to be copied to the active pane 26.

Figure 3A:
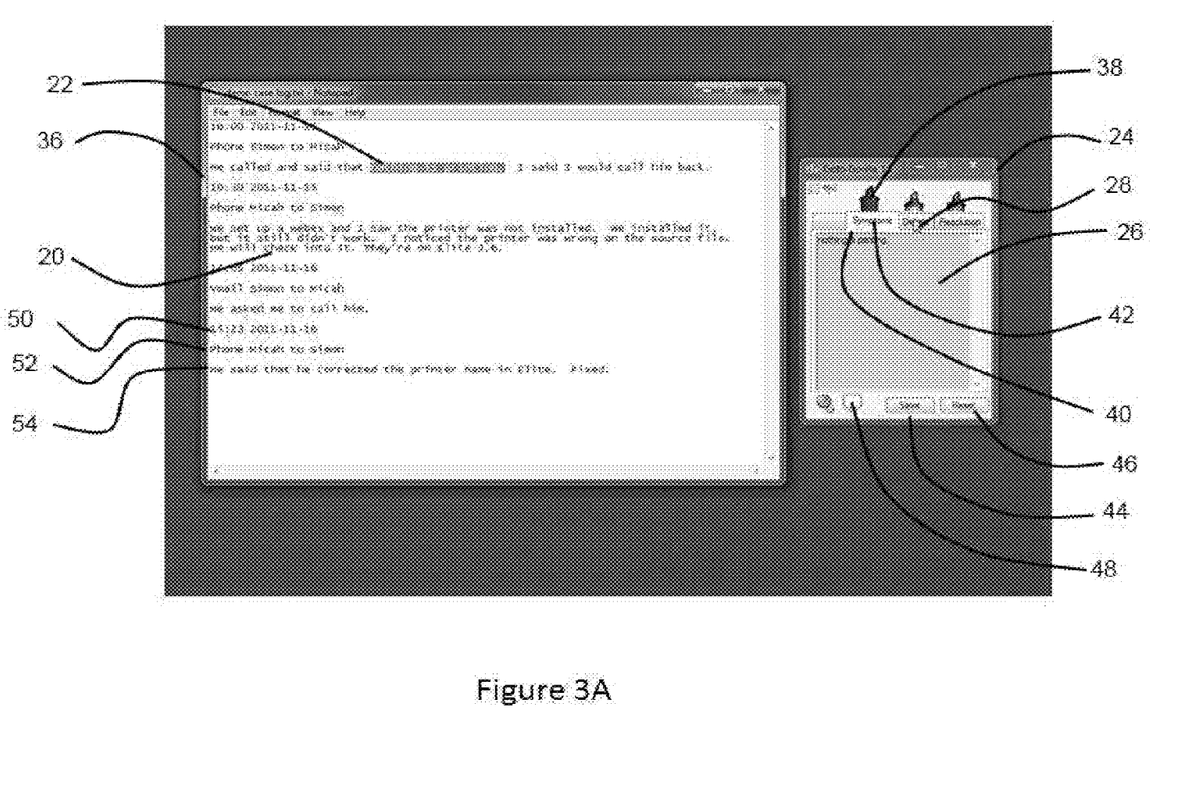
FIGS. 3A, 3B and 3C provide sample display screens of a knowledgebase article authoring apparatus in accordance with an illustrative embodiment of the present invention.

Referring to FIG. 3A, as discussed above, clicking on a pane 26 of the applet 24 activates the cursor 28 such that a selected text snippet 22 of an electronic document 20, such as one displayed by a word processor 36 may be highlighted. The pane 26 may be color coded, for example using the colors red, yellow and green, and in this regard may also include colored graphical icons 38 representative of the pane's 26 function. The panes as in 26 are illustratively selectable using a tab 40 which may also include a title for the pane, indicative of the type of text to be copied to the pane. Other functions such as save and reset may be provided via respective save and reset buttons 44, 46 as well as a console button 48 to launch the console/search applet, as will be discussed in more detail below.

Figure 3B:
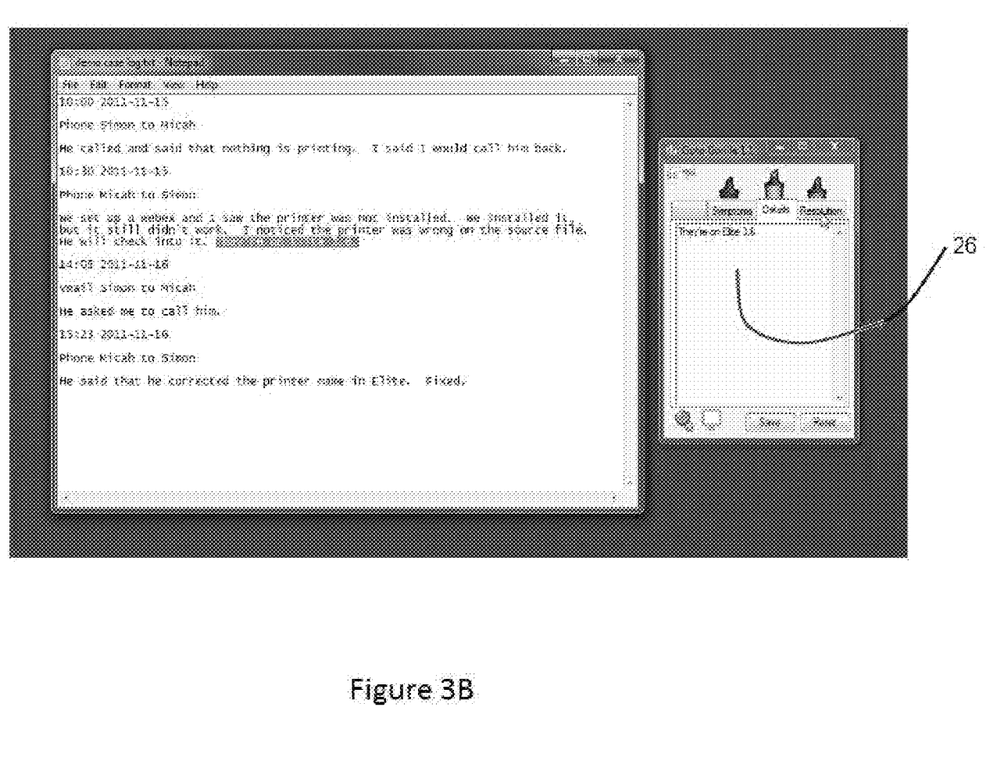

Still referring to FIG. 3A, by way of illustrative example, the electronic document 20 is a technical support ticket displayed by the word processor 36. The ticket 20 includes a variety of different data including time stamps 50, an activity 52 such as a phone call, email or the like and additional text 54 describing the contents of the activity 40 and its related discussions. Different time stamps 38, activities 40 and additional texts 42 describing the contents of the activities 40 can occur many times within one technical support ticket 20. By transferring the significant elements of the technical support ticket 20 to the applet 24 and subsequently saving, using the save button 44, the significant elements in the knowledgebase 12, a knowledgebase can be quickly developed. Indeed, as shown in FIG. 3A information related to the symptoms can be copied to a "symptoms" pane 26 illustratively color coded red, as shown in FIG. 3B information related to details can be copied to a "details" pane 26 illustratively color coded yellow and, as shown in FIG. 3C, information related to the problem resolution can be copied to a "resolution" pane 26, illustratively color coded green.

Figure 3C:
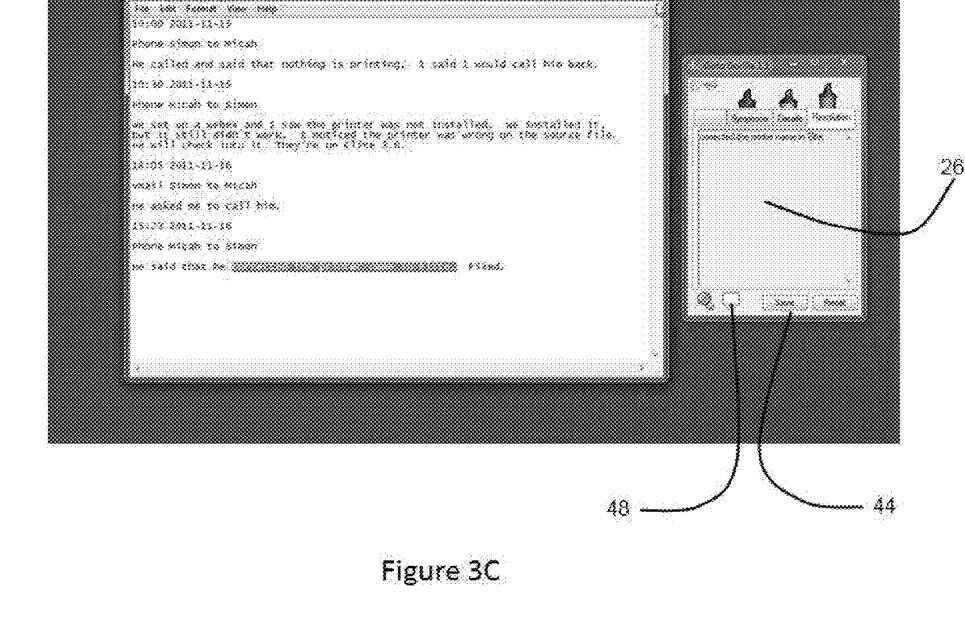

Still referring to FIG. 3C, as discussed above, subsequent actuation of the save button 44 serves to publish the contents of all of the panes as in 26 together as an article 14 comprising the symptoms, details and resolution data fields which is saved within the knowledge base 12.

Figure 4A:
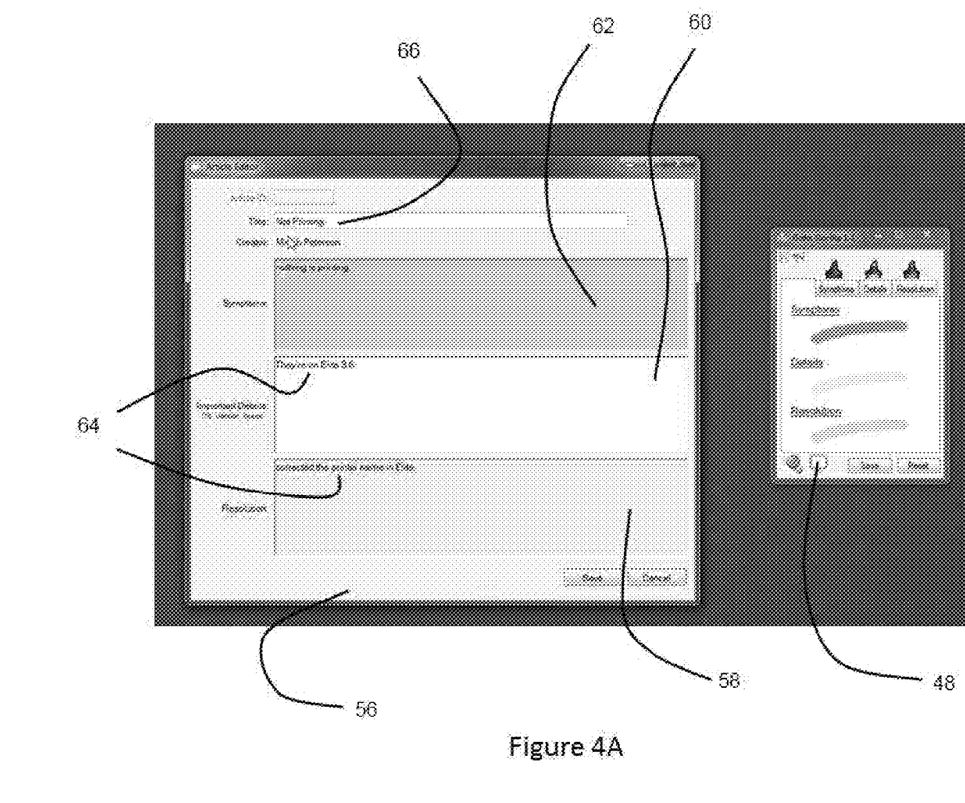
FIGS. 4A and 4B provide sample display screens of an article editing applet component of a knowledgebase article authoring apparatus in accordance with an illustrative embodiment of the present invention.
Figure 4B:
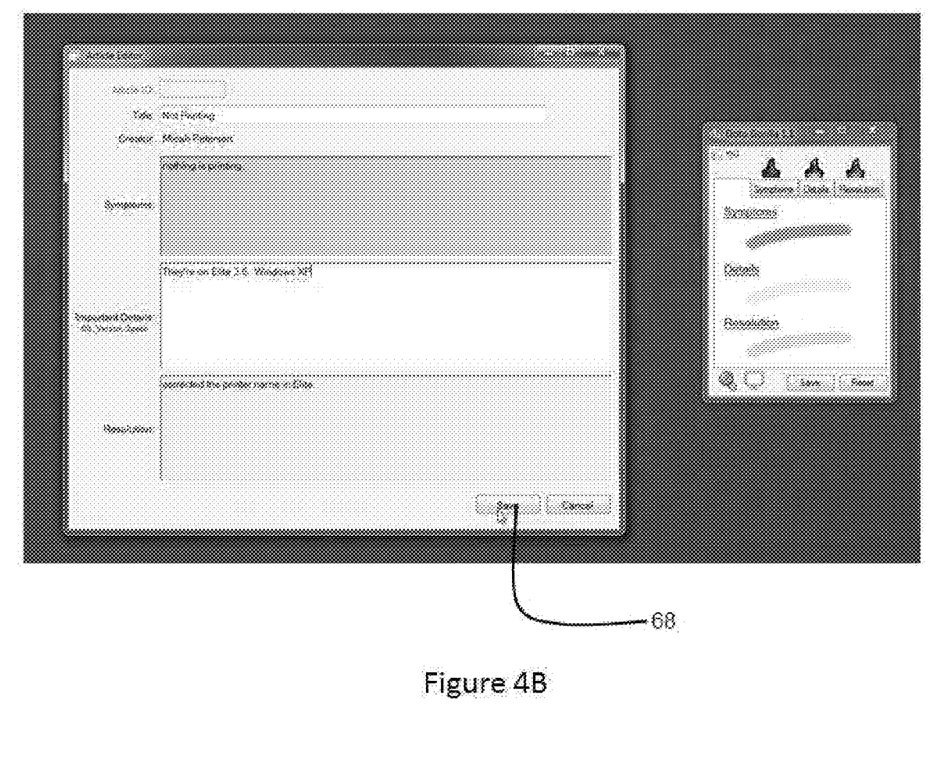

Referring now to FIG. 4A, actuation of the save button 44 causes the editing applet 56 to be launched wherein the text within the panes as in 26 is displayed in their respective data fields 58, 60, 62 together as a published article 14. The editing applet 56 provides a convenient interface for editing the article text 64 prior to saving it in the knowledgebase 12, for example by annotating the article with additional text (FIG. 4B). Additionally, a title input field 66 is provided for annotating the article with a title. The display fields of the editing applet 56 are illustratively color coded in the same fashion as the authoring applet 24 to improve user navigation and understanding.

Referring to FIG. 4B, following modification of the text and addition of a title or the like, the article can be saved in the knowledgebase 12 by actuating the save button 68.

Figure 5:
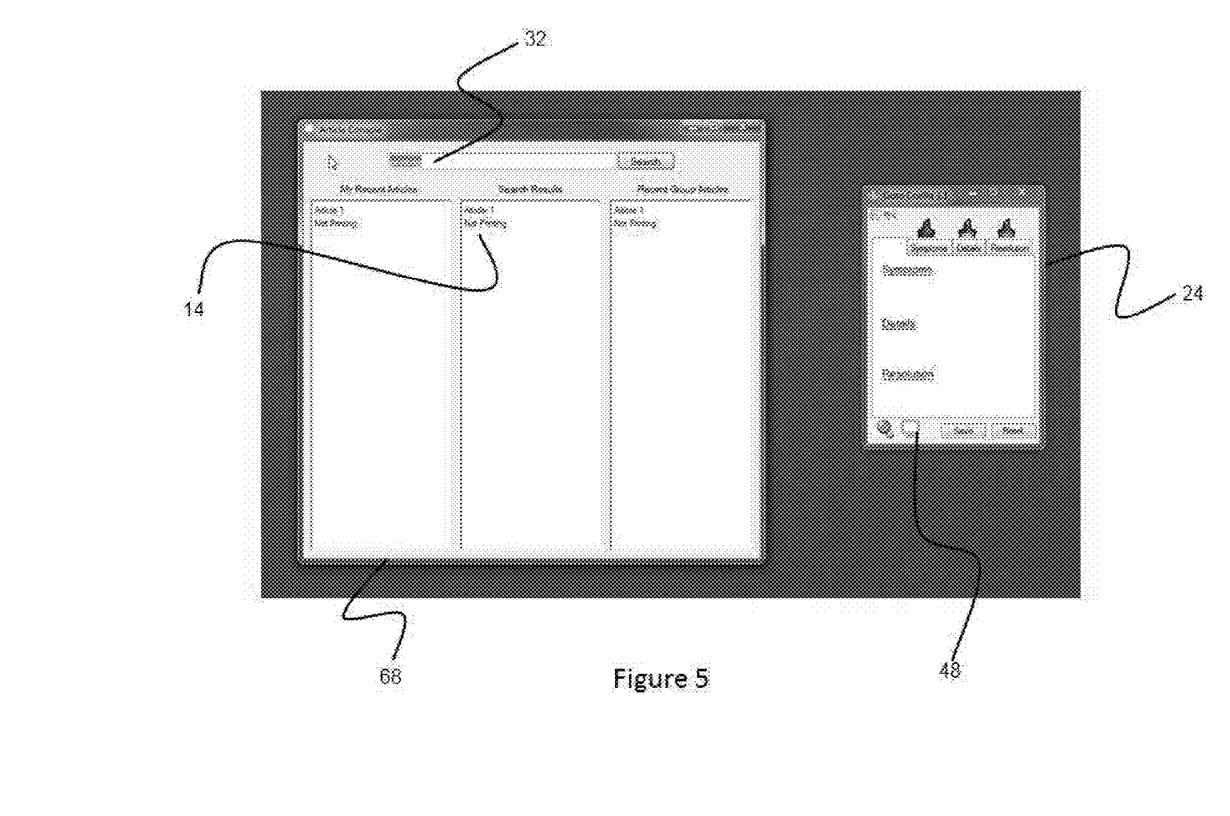
FIG. 5 provides a sample display screen of searching applet component of a knowledgebase article authoring apparatus in accordance with an illustrative embodiment of the present invention.

Referring now to FIG. 5 in addition to FIG. 1, actuation of the console button 48 on the authoring applet 24 initiates the display of the article console 68, which provides a convenient means for displaying articles 14 in the knowledgebase 12 searched using keywords 32.

Referring back to FIG. 1 and FIG. 3A, in an alternative embodiment the knowledgebase 12 could comprise a plurality of case briefs as articles 14 and where the electronic document 20 is a decision rendered by a court. Illustratively, the knowledgebase article 14 comprises a facts data field, a ratio data field and a holding data field. The electronic document is a decision rendered by a court comprising at least a facts text, a ratio text and a holding text. The first pane is associated with the facts data field, the second pane is associated with the ratio data field and the third pane is associated with the holding data field. The article further comprises a title data field having the plaintiff and defendant's name therein and a citation data field having the case citation therein.

Although the present invention has been described hereinabove by way of non-restrictive illustrative embodiments and examples thereof, it should be noted that it will be apparent to persons skilled in the art that modifications may be made to the illustrative embodiments without departing from the spirit and the scope of the present invention.

The invention claimed is:

1. A method for authoring an article entry comprising a plurality of data fields from at least one electronic document and storing the article in a knowledgebase, the at least one electronic document each comprising at least one readable text snippet, the method comprising the acts of:

(a) displaying the at least one electronic document on an electronic display;
 (b) displaying an applet comprising a plurality of panes on said electronic display, one of each of said panes associated with a respective one of the article entry data fields and configured for receiving and displaying a pane content;
 (c) activating one of said panes;
 (d) using a selection device to highlight a text snippet from the at least one electronic document by moving a cursor to a start of said text snippet, engaging and holding a user operable selection means while moving said cursor to an end of said text snippet wherein on release of said user operable selection means said highlighted text snippet is copied to said active pane as said pane content;
 (e) repeating acts (c) and (d) for each of said plurality of panes; and
 (f) storing said pane content as the article entry in the knowledgebase, wherein for each of said panes, said pane content is stored in the article entry data field associated with said pane.

2. The method of claim 1, wherein said user operable selection means is a button and wherein engaging said user operable selection means comprises depressing said button and releasing said user operable selection means comprises releasing said button.

3. The method of claim 1, wherein said user operable selection means is a touch screen and wherein engaging said user operable selection means comprises placing a finger on said touchscreen at said text snippet start and releasing said user operable selection means comprises removing the finger from said touchscreen when the finger reaches said text snippet end.

4. The method of claim 1, wherein said applet comprises three panes.

5. The method of claim 4, wherein the knowledgebase is a technical support knowledgebase and the knowledgebase article entry comprises a symptoms data field, a details data field and a resolution data field and the at least one electronic document is a technical support document comprising at least a symptoms text, a details text and a resolution text and further wherein said first text snippet is said symptoms text, said second text snippet is said details text, said third text snippet is said resolution text, said first pane is associated with said symptoms data field, said second pane is associated with said details data field and said third pane is associated with said resolution data field.

6. The method of claim 4, further comprising associating a distinct color with each of said panes.

7. The method of claim 6, wherein red is associated with said first pane, yellow is associated with said second pane and green is associated with said third pane.

8. The method of claim 1, further comprising, prior to said storing act, the act of activating one of said panes and modifying said active pane content.

9. The method of claim 8, wherein said modifying act comprises annotating said active pane content with additional text.

10. The method of claim 1, further comprising, prior to said storing act, the act of displaying an editing applet comprising a plurality of editable fields on said electronic display, each of said editable fields displaying for user modification said pane content of a respective one of said panes.

11. The method of claim 1, wherein the knowledgebase article entry further comprises a title data field, said applet comprises a title input field and further comprising, prior to said storing act, the act of inserting a title into said title input field, and wherein said storing act further comprises storing said inserted title in said article entry title data field.

12. The method of claim 4, wherein the knowledgebase is a case brief knowledgebase and the knowledgebase article entry comprises a facts data field, a ratio data field and a holding data field and the at least one electronic document is a decision rendered by a court comprising at least a facts text, a ratio text and a holding text and further wherein said first text snippet is at least a portion of said facts text, said second text snippet is at least a portion of said ratio text, said third text snippet is said holding text, said first pane is associated with said facts data field, said second pane is associated with said ratio data field and said third pane is associated with said holding data field.

13. The method of claim 12, wherein the knowledgebase article entry comprises a title data field and a citation data field, said decision comprises a plaintiff name, a defendant name and a decision, said applet comprises a title input field and a citation input field and further comprising, prior to said storing act, the act of inserting said plaintiff name and said defendant name into said title input field and said citation into said citation input field, and wherein said storing act further comprises storing in the knowledgebase said plaintiff name and said defendant name in said article entry title data field and said citation in said article entry citation data field.

14. The method of claim 1, wherein the act of activating said panes comprises using said selection device to move said cursor over a pane to be activated and depressing and releasing said button.

15. The method of claim 1, wherein said applet is always on top.

16. An a computer system including a computer processor for authoring, storing and searching a plurality of knowledgebase articles based on at least one electronic document each comprising at least one text snippet, the computer comprising:
  a knowledgebase for storing the plurality of articles, each article comprising a plurality of data fields;
  an electronic display;
  a selecting device comprising a user operable button;
  an article authoring applet displayed on the monitor, the applet comprising a plurality of panes, one of each of said panes associated with a respective one of the plurality of article data fields, wherein said selection device is used to highlight a text snippet from the at least one electronic document by moving a cursor to a start of said text snippet, engaging and holding a user operable selection means while moving said cursor to an end of said text snippet wherein on release of said user operable selection means said highlighted text snippet is copied to an active pane as a pane content;
  selecting one of said panes as said active pane;
  storing said pane content of said plurality of panes as an article in the knowledgebase, wherein for each of said panes, said pane content is stored in the article data field associated with said pane; and
  a search engine comprising a keyword search input field and a search results display, wherein when a keyword entered via the search input field matches an article in said knowledgebase, at least a title of said article is displayed in said search results display.

17. The computer system of claim 16, wherein said selecting device is a computer mouse and said user operable selection means is a mouse button.

18. The computer system of claim 16, wherein said applet comprises three of said panes.

19. The computer system of claim 16, wherein said article authoring applet further comprises a means for manually editing said pane content of said active pane.

20. The computer system of claim 19, wherein editing said pane content comprises at least one of adding text to said pane content, deleting text from said pane content and modifying said pane content.

21. The computer system of claim 16, wherein each article further comprises a title data field, said applet comprises a title input field and further wherein said storing means stores a content of said title input field in the article title data field.

22. A non-transitory computer readable storage medium including a memory for storing and executing comprising a computer program executing on the system, wherein the program:
  maintains a knowledgebase having a data structure comprising a plurality of data fields;
  displays at least one electronic document each comprising at least one readable text snippet on a display monitor;
  displays an applet comprising a plurality of panes on the display monitor, one of each of said panes associated with a respective one of the plurality of data fields and configured for receiving and displaying a pane content;
  provides a means for selectively activating each said panes, wherein only one of said panes is active at a time;
  for each of said panes when activated, provides a user operable selection device for highlighting a text snippet from the at least one electronic document by moving a cursor to a start of said text snippet, engaging and holding a user operable selection means while moving said cursor to an end of said text snippet wherein on release of said user operable selection means said highlighted text snippet is copied from the at least one document to said active pane as said pane content;

stores said pane content as an article entry in the knowledgebase, said article entry having the data structure and wherein for each of said panes, said pane content is stored in the article entry data field associated with said pane; and provides a search engine comprising a keyword search input field and a search results display, wherein when a keyword entered via the search input field matches an article entry in said knowledgebase, at least a title of said article entry is displayed in said search results display.

* * * * *